July 11, 1933. G. L. KYLE 1,918,044
STORAGE BATTERY
Filed Aug. 31, 1928
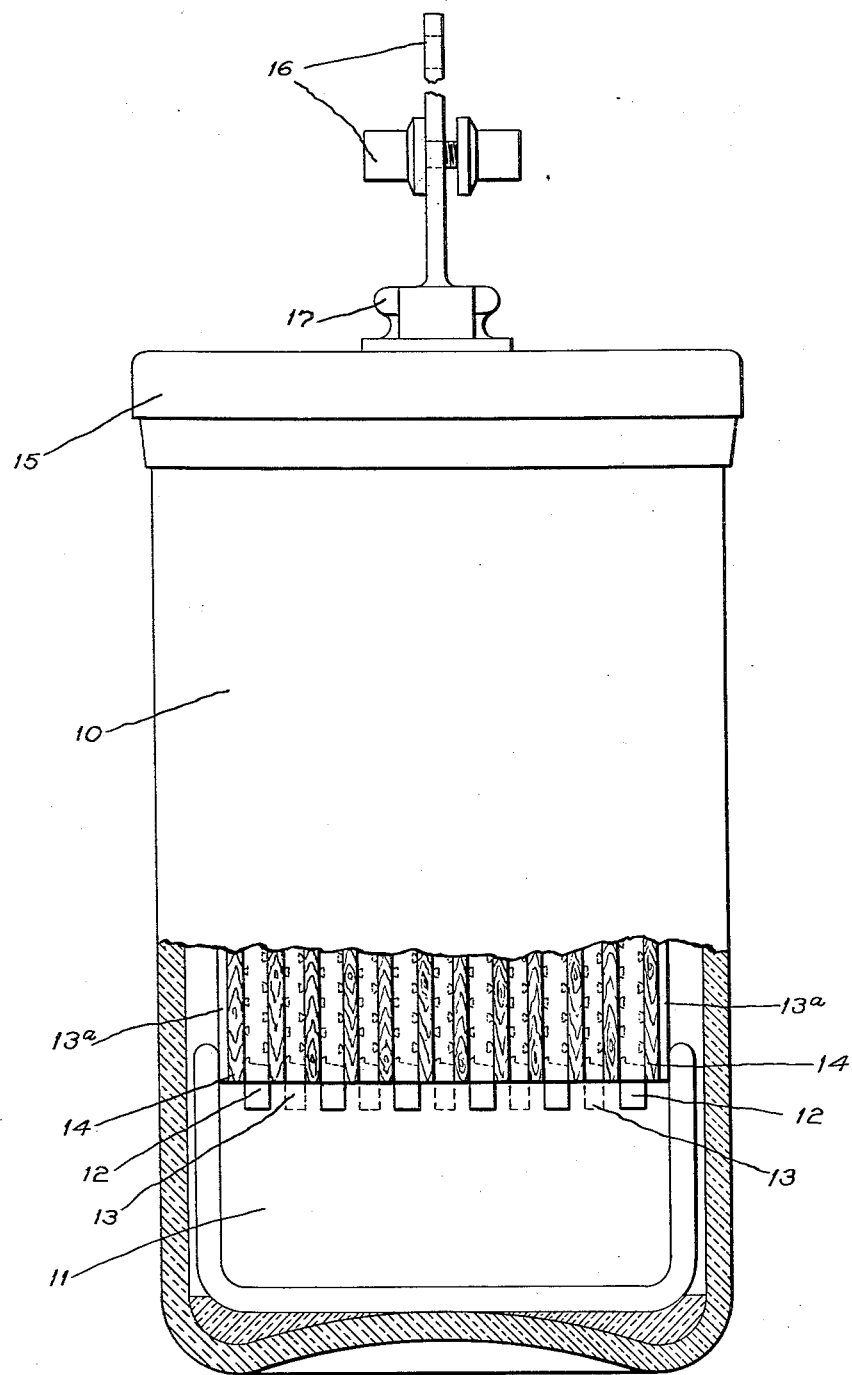
INVENTOR.
George L. Kyle
BY Raymond H. Van Nest
ATTORNEY Patented July 11, 1933

1,918,044

UNITED STATES PATENT OFFICE

GEORGE L. KYLE, OF NIAGARA FALLS, NEW YORK, ASSIGNOR TO USL BATTERY CORPORATION, OF NIAGARA FALLS, NEW YORK, A CORPORATION OF NEW YORK

STORAGE BATTERY

Application filed August 31, 1928. Serial No. 303,193.

My invention relates to storage batteries and more particularly to a novel arrangement of the plates in a storage battery whereby the life of the battery is prolonged and the battery is improved in appearance.

There are two types of plates commonly used in storage batteries, the Planté, or solid lead plates, and the Faure, or pasted plates which consist of a skeleton framework of lead paste filling the spaces between the ribs of the framework. Because of its lightness and many other advantages possessed by the latter type of plate, and which are well known to those skilled in the art, it has been generally adopted for use in automobile, radio and farm light storage batteries. During the use of such a battery there is a thickening of the plates due to the growth of the active material on the surfaces thereof and a consequent tendency of the plates to spread. As a result, particles of active material which become loosened, may easily drop between the plates to the bottom of the container, thereby reducing the capacity and life of the battery. Further, in batteries of the above-mentioned type which are provided with a container of glass or other transparent material, as for example, farm lighting batteries, the two outside negative plates which are exposed to view are rendered unsightly in appearance by the growth or bulging of the active material on the surfaces thereof.

I have overcome these difficulties by providing a battery in which the two outer negative plates are of the solid lead type, while the other plates in the group are of the pasted type, thereby providing a very compact battery element, the many advantages of which will be apparent as the description proceeds.

An object of the present invention is to provide a storage battery wherein the spread of the plates due to bulging of the active material, is reduced to a minimum.

A further object of this invention is to provide a storage battery wherein shedding of the active material by the plates is greatly reduced, thereby prolonging the life of the battery.

A further object of this invention is to provide a storage battery which when enclosed in a transparent container or casing, will present a more sightly appearance than those heretofore in use.

A better understanding of my invention may be had by reference to the attached drawing wherein the single figure is an end elevation of a storage battery with the lower portion of the container broken away and showing one form of my invention.

Reference numeral 10 designates a transparent storage battery container such as is usually employed in the so-called farm lighting type of battery. Within the casing 10 and resting on bridges 11 (one shown) of porcelain or other suitable insulating material, are the positive plates 12 and the negative plates 13, arranged in alternation, with separators 14 therebetween, the plates of like polarity being connected at the top by a lead strap (not shown) in the usual and well known manner. Extending upwardly from each said strap and passing through the cover 15 is a terminal 16, whereby the battery may be connected into a circuit. An opening (not shown) is provided in the cover 15 for the introduction of electrolyte into the cell and is closed by a vent plug 17. The electrolyte may be a dilute solution of sulphuric acid. The two outer plates, designated 13—a, are of the solid lead type, while the remaining negative plates 13 and positive plates 12 are of the pasted type. The plates 13—a, being of relatively great weight and strength, will hold the assembled plates 12 and 13 and separators 14 in very compact relationship and will resist any tendency of the plates to spread, due to bulging of the active material, thus rendering it difficult for loose particles of active material to slip between the plates and fall to the bottom of the container. By reducing to a minimum the shedding of active material by the plates, the life of the battery is greatly extended, as will be readily appreciated by those skilled in the art.

From the above description it will be seen that when a battery constructed according to my invention is housed in a transparent container such as that illustrated in the drawing, the only plates of which a substantial part is visible are the two outer or solid lead plates 13—a. The formation or bulging of the active material on the surfaces of the plates of this type appears so slowly as not to be perceptible over a period of time equal to the life of the battery. It is obvious that a battery embodying my invention will present a much more sightly appearance than one in which plates of the pasted type are exposed to view. It will thus be seen that I have provided a battery which is of extremely compact construction and which, as a result, will have a much longer life than batteries of a similar type which have heretofore been used.

It is to be understood that although I have illustrated one form of my invention as applied to a storage battery of the farm lighting type, it is equally applicable to many other types of storage batteries. I do not therefore, intend to limit myself to the use of my invention for a particular type of storage battery or to the form of my invention illustrated. It is my intention that this patent shall cover all modifications of my invention which fall within the scope of the appended claims.

What I claim as new and desire to secure by Letters Patent of the United States, is

1. A storage battery group comprising a plurality of pasted positive plates, a plurality of negative plates arranged in alternation with said positive plates, the two outer of said negative plates being solely of the solid type and the remainder of said negative plates being of the pasted type, means for insulating each plate from the adjacent plates and bus bars directly connected to the positive and negative plates respectively, the lower portion of said group being entirely immersed in electrolyte.

2. A storage battery cell comprising a container, a cover on said container, a battery element positioned within said container of less width than the width of said container, said battery element consisting of a plurality of pasted positive plates and a plurality of negative plates arranged in alternation with said positive plates, the outer two of said negative plates being solely of the Planté type and the remainder of said negative plates being of the pasted type and bus bars directly connected to the positive and negative plates respectively.

In witness whereof, I have hereunto subscribed my name.

GEORGE L. KYLE.